United States Patent [19]
Chambaut

[11] 3,795,817
[45] Mar. 5, 1974

[54] POWER TRANSMISSION DEVICE IN PARTICULAR FOR A SUBMARINE CAMERA

[75] Inventor: Jean Francois Chambaut, Paris, France

[73] Assignee: Thomson-CSF, Paris, France

[22] Filed: Mar. 2, 1973

[21] Appl. No.: 337,466

[30] Foreign Application Priority Data
Mar. 3, 1972 France .............................. 72.07532

[52] U.S. Cl. .................... 307/38, 340/4 R, 95/11 W
[51] Int. Cl. .............................................. H02j 1/00
[58] Field of Search ................... 307/38, 39, 40, 41; 95/11 UW, 11 W, 11 HC, 110 R; 340/4 R

[56] References Cited
UNITED STATES PATENTS
2,019,059   10/1935   Sherman ............................ 95/11 W
2,060,670   11/1936   Hartman ............................ 95/11 W Primary Examiner—Robert K. Schaefer
Assistant Examiner—M. Ginsburg
Attorney, Agent, or Firm—Cushman, Darby & Cushman

[57] ABSTRACT

A single cable is used to transfer power in the form of a d.c. current from the first part of a system to a second part as well as control signals for controlling, by means of a switching device, the states of comparatively high-power consuming elements, such as projectors, the changes of state of which temporarily disrupt the operation of the signal transmission circuits.

An inhibiting circuit is provided for preventing the switching device from being actuated again by parasitic signals during such a transition time interval. This inhibiting circuit comprises storing elements respectively connected in parallel with the control inputs of the switching device, for temporarily storing the control signals applied thereto, and blocking circuits serially inserted with those control inputs, each blocking circuit in series with a control input being actuated by the storing elements connected in parallel with the other control inputs.

2 Claims, 3 Drawing Figures

POWER TRANSMISSION DEVICE IN PARTICULAR FOR A SUBMARINE CAMERA

The present invention relates to a device for transmission, through a single cable, of electrical power and electrical signals.

It is well-known to transmit through a single cable, energy of frequency 0, i.e. d.c. voltage and signals representing data. In the case where the energy to be transmitted is substantial and where the currents corresponding to this energy are subject to large and sudden variations, due to switching of equipment, disturbances are produced which either affect the normally transmitted electrical signals, or constitute false signals ; in this case, the single cable idea has hitherto been adandoned in favour of either a multiple cable or several individual cables with, as attendant drawbacks, problems of reliability, price, size and handling.

The object of the present invention is a device for controlling transmission, through a single cable, of electrical power, with possible variations of several hundreds watts and more, which device makes it possible to avoid disturbances to the electrical signals transmitted through said single cable.

In accordance with the invention, there is provided a system for transmitting electrical power to a plurality of devices, including $n$ first devices where $n$ is a positive integer, said $n$ first devices having respective inputs, said system comprising : a power unit, having an output, for delivering power in the form of a d.c. voltage; a control unit for generating $2n$ control signals, said control unit having an output for delivering said control signals ; a cable having first and second ends, said first end being coupled to said output of said power source and to said output of said control unit ; a switching device having a power input coupled to said second end for receiving said electrical power, $n$ power outputs respectively coupled to said $n$ first devices, and $2n$ control inputs ; $2n$ gating circuits havig respective inputs coupled to said second end for respectively receiving said $2n$ control signals and having respective outputs respectively coupled to said $2n$ control inputs ; $2n$ memory circuits for, respectively, temporarily storing the output signals from said $2n$ gating circuits, said memory circuits having respective inputs respectively connected to said outputs of said $2n$ gating circuits, each of said $2n$ memory circuits having an output connected to the $2n-1$ gating devices to which its input is not connected.

The invention will be better understood and other of its features rendered apparent from a consideration of the ensuing description and the related drawings in which.

Figure 1:
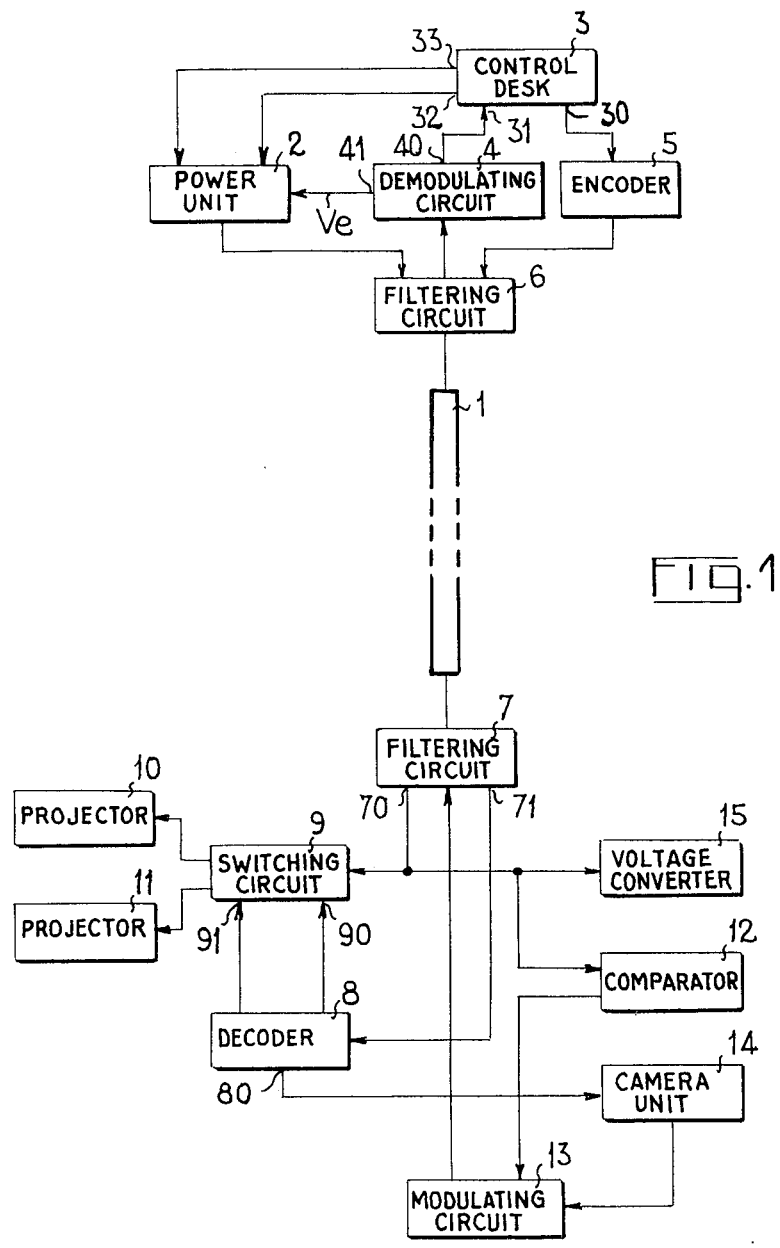
FIG. 1 is a diagram of an embodiment of the control device in accordance with the invention, utilised in a submarine television system.

FIG. 1 illustrates a camera system which comprises a submarine equipment including a camera 14 and projectors 10 and 11, a control unit on board a ship including a control desk 3 and a power source 2, and a single cable 1 used for transmitting power to the submarine equipment and also for the exchange of signals between the submarine equipment and the control unit.

The submarine equipment is arranged in a hermetically sealed enclosure. The fact that the power source 2 is located in the control unit rather than in the submarine equipment is due to the need to give the latter a small volume and weight, while avoiding a heating of the sealed enclosure. But this involves a disturbance of the electrical signals transmitted by the cable at the time of lighting up an extinction of the projectors.

Cable 1 is a sheathed coaxial cable, which may have a length of several hundred meters. Identical ground potentials in the submarine equipment and in the control unit are ensured by means of the cable sheath.

The control unit will now be described in more detail. The control desk has a plurality of outputs 30, coupled through an encoding circuit 5 and a transmit-receive filtering circuit 6, to the first end of coaxial 1. The encoding circuit 5 samples in a multiplexer system the data which it receives from the control desk 3, and transmits those data sequentially. A power unit 2, the power input of which has not been shown, is also connected by its output, through the filtering circuit 6, to the first end of the cable 1 which can thus be supplied with the electrical signals coming from the encoding circuit 5 and the electrical power coming from the power unit 2 ; this power unit also comprises two inputs respectively connected to two outputs 32, 33 of the control desk 3.

In the submarine equipment, the second end of the cable 1 is connected to the input of a second transmit-receive filtering circuit 7, the signal output 71 of which is connected to the input of a decoding circuit 8. The decoding circuit 8 comprises a set of outputs 80 connected to the inputs, represented by a single terminal, of the camera unit 14. In normal operation the camera unit produces a video signal which modulates a carrier wave generated in a modulating circuit 13 by a local oscillator ; the resultant signal is transmitted by the filtering circuit 7, the cable 1 and the filtering circuit 6, to the input of a demodulating circuit 4 which reconstitutes the video signal at its output 40, and this video signal is applied to an input 31 of the control desk 3.

The filtering circuit 7 comprises a power output 70 connected to the power input of a switching circuit 9, and this circuit is connected by two signal inputs 90, 91 to two further output of the decoding circuit 8 ; the switching circuit 9 has two outputs respectively connected to two projectors 10, 11, of 500 watts each. A voltage comparator circuit 12, comprising an internal reference voltage, has its input connected to the output 70 of the filtering circuit 7 ; in normal operation, this comparator circuit supplies a control voltage to the modulating circuit 13 which converts it to pulses representing this voltage, which pulses are transmitted during the line blanking intervals of the video signal ; these pulses pass through the filtering circuit 7, the cable 1 and the filtering circuit 6, and are applied to the demodulating circuit 4 which converts them into and error signal $V_e$ applied, by an output 41, to a control input of the power unit 2, in order thus, to maintain a fixed voltage at the output 70 of the filtering circuit 7, as will explained later on.

A voltage converter 15, designed to supply the direct voltages required for the operation of the elements contained in the circuits 8, 9, 12, 13 and in the camera unit 14, has its input connected to the output 70 of the filtering circuit 7, its outputs and the corresponding connections not having been shown in order not to overburden the drawing.

The television and control signals are transmitted in any conventional way used in single-cable television system. A detailed description of the power transmitting system will now be given.

The orders which may be transmitted from the control unit as concerns the projectors are the lighting up or extinction of a single one of the projectors.

If, therefore, the two projectors being extinguished, a command is given by the control desk 3 to light up the projector 10, a signal is sent via one of the outputs 30 to the input 90 of the switching circuit 9, in the form of a 1 level for example, the 0 level corresponding to extinction of the projector. The switching circuit then establishes the connection between the output 70 and the projector 10. Because the cold resistance of the projectors is low, in the order of 2 ohms, while the d.c. resistance of the cable is in the order of 10 ohms; and because of the self-induction in the filters of filtering circuits 6 and 7 at the instant when the current is drawn, the voltage terminal 70 drops suddenly to a value near 0; thereafter, the filament resistance rising as it heats, this voltage returns over a period in the order of 100 ms, to a value which enables the voltage converter 15 to supply the correct output voltages. When these voltages are correct, the comparator circuit 12 can operate again, but a fraction of a second elapses before the same condition is achieved by the modulating circuit 13, the latter requiring that the video signal is produced again by the camera unit 14, in order for it to operate. The decoding circuit 8 is the last to be able to start operating normally again, since it is necessary for its clock signal to be synchronised with that of the coding circuit 5 and this, for it to be sure, requires that all the other elements of FIG. 1 shall have reached their equilibrium state, in particular that the supply current to the projector 10 shall have stabilised. In order to prevent parasitic signals from producing unwanted lighting up and extinction of the projectors, which would totally disturb the operation of the submarine equipment, arrangements are made to store, in the switching circuit 9, the received order and to temporarily render inoperative any other order transmitted to this switching circuit.

Figure 2:
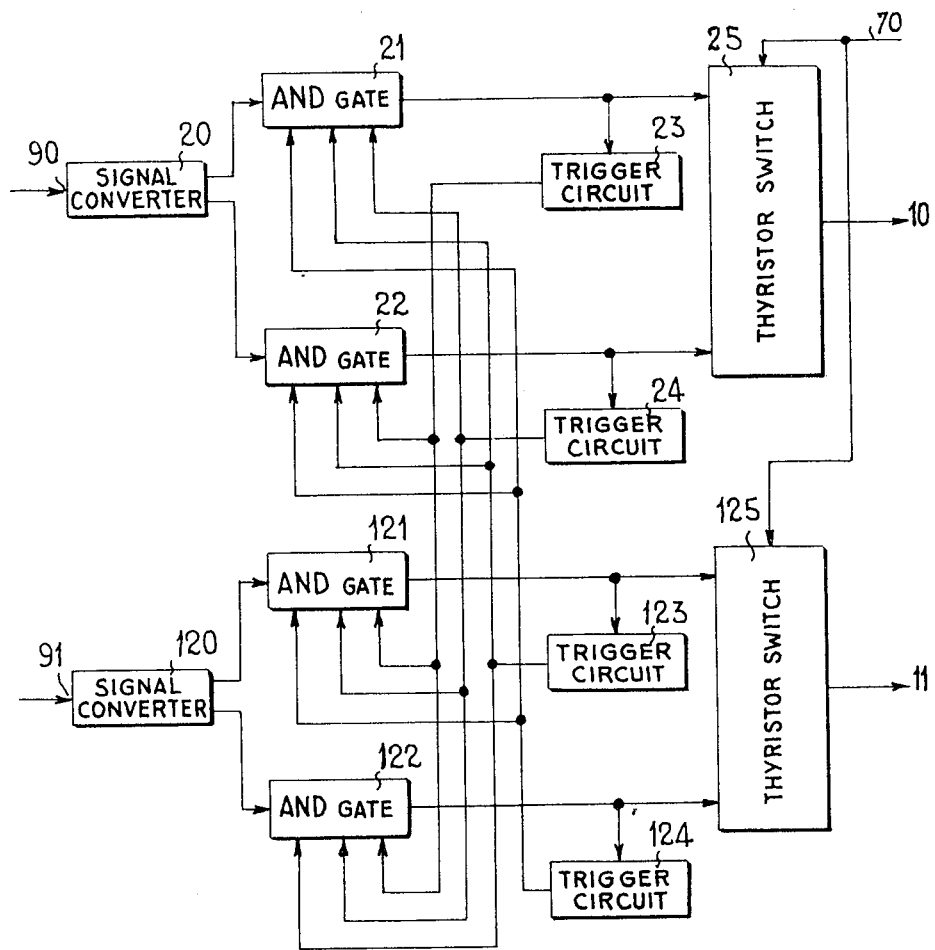
FIG. 2 is a diagram of an embodiment of the element 9 in FIG. 1.

FIG. 2 illustrates an embodiment of the switching circuit 9 shown in FIG. 1. In this drawing, the two inputs 90, 91 of the switching circuit 9 have been shown again; these inputs are the respective inputs of two signal-converter circuits 20 and 120. Each of these converter circuits comprises an input differentiator connected, on the one hand, to the first output of the circuit by a pulse-shaper device, and on the other hand to the second output of the circuit by an inverter followed by another pulse-shaper; considering the converter circuit 20, a pulse will appear at its first output in respect of a transition from the level 0 to the level 1 on the part of the signal applied to it, that is to say a signal calling for the lighting up of the projector 10, while the pulse will appear at its second output in the case of a signal calling for the extinction of this projector 10. The first output of the circuit 20 is connected to one input of an AND-gate 21 with four inputs, the output of which is connected, on the one hand, to the input of a monostable trigger circuit 23, and, on the other hand, to the first control input of a thyristor store switch 25, the output of the latter constituting the output of the switching circuit 9 corresponding to the projector 10. The second output of the circuit 20 is connected to one input of an AND-gate 22 with four inputs, whose output is connected, on the one hand, to the input of a monostable trigger circuit 24 and, on the other hand, to the second control input of the store switch 25. The converter circuit 120, in the same manner as the circuit 20, is coupled to the two inputs of a thyristor store switch 125 the output of which constitutes the output of the switching circuit 9 corresponding to the projector 11. The circuit coupling the input 91 to the two control inputs of the store switch 125 is identical to that which couples the input 90 to the two inputs of the store switch 25, and reference numbers differing by 100 being used for corresponding elements of the two circuits. The monostable trigger circuits 23, 24, 123 and 124 of this circuit all have the same quasi-stable state time T; each of these trigger circuits is connected by an inverted output, to one input of each of the AND-gate (21, 22, 121, 122) other than that of the output of which it is connected; for example, the four inputs of the AND-gate 121 are respectively connected to the first output of the converter circuit 120 and to the outputs of the monostable trigger circuits 23, 24 and 124.

The store switches 25 and 125 are, in the example described, well-known circuits using a thyristor for the light-up function, a thyristor for the extinguish function, a capacitor and a resistor, lighting up and extinction being controlled by a pulse to the control gate of the corresponding thyristor.

It will first be assumed that the two projectors have been extinguished for a time longer than the duration T of the quasi-stable state of the trigger circuits, so that the latter are all in their stable states and that each of the four AND-gates is energized on three of its four inputs. Thereafter a control signal for lighting up the projector 10 is applied to the input 90 of the converter circuit 20. This results in a pulse appearing at the first output of this converter circuit and energizing the fourth input of the AND-gate 21. The output pulse thus delivered by this gate on the one hand causes the thyristor switch to couple the projector 10 to the power input 70. On the other hand this output pulse triggers the monostable trigger circuit 23 into its quasi-stable state, for which a given one of the inputs of each of the AND-gates 22, 121 and 122 ceases to be energized for a duration T. The time T is made sufficiently long to ensure that when it has elapsed, the decoding circuit 8 of FIG. 1, will definitely be producing the correct signals, and in the present case this time is three seconds.

Figure 3:
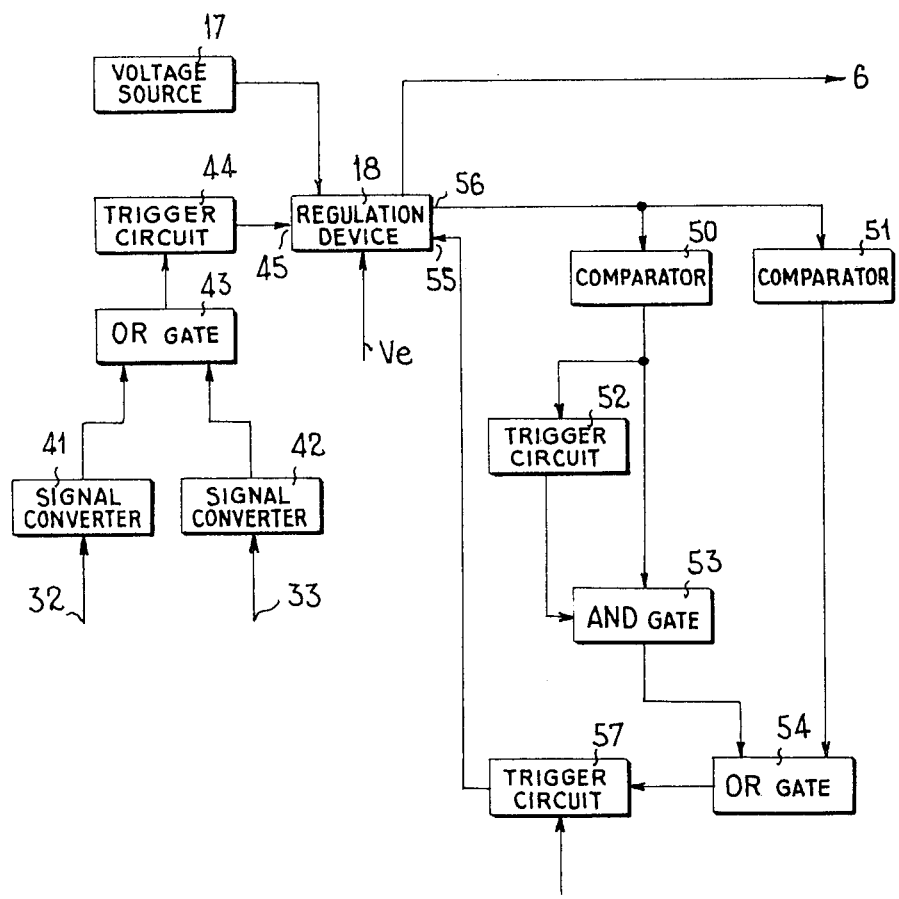
FIG. 3 is a diagram of an embodiment of the element 2 in FIG. 1.

FIG. 3 is a diagram of an embodiment of the power unit 2 shown in FIG. 1.

In this drawing, a voltage source 17 delivering a rectified and filtered voltage $V_a$ and a regulation device 18 are shown. The latter device essentially comprises a d.c. amplifier to the supply input of which the output of the voltage source 17 is connected. The input of the amplifier is normally coupled to the regulation input of the power unit 2 (FIG. 1) for receiving the signal $V_e$, the output of the regulation device being so connected to the amplifier as to supply the voltage $V_a - V_s$ where $V_s = K.V_e$, K being the amplification coefficient of the amplifier. The regulation device 18 also comprises two further control inputs, namely a blocking input 55 and a clamping input 45, the first one being used for blocking the amplifier so that the output voltage from the regulation device be zero, and the second one for making this output voltage equal to a predetermined value. For this second purpose the regulation device may include a fixed voltage source and a switch, actuated by the signal applied to the input 45, for disconnecting the regulation input of the regulation device from the input of the amplifier and connecting it to this fixed voltage source.

The regulation device further comprises an auxiliary output 56 delivering a voltage proportional to the output current from the power unit.

FIG. 3 also shows two converter circuits 41, 42 similar to those 20 and 120 in FIG. 2, but in which only the first output is used. The outputs of the circuits 41, 42 are coupled, through an OR-gate 43 followed by a monostable trigger circuit 44 whose quasi-stable state time is $T_1$, to the clamping input 45 of the regulation device 18.

On the other hand, the output 56 of the regulation device is connected to the inputs of two comparators 50, 51 each with its own internal reference voltage corresponding respectively to two output currents from the power unit, namely $I_m$ and $I_M$, where $I_M > I_m$. The output of the comparator 50 is connected directly to the first input of an AND-gate 53 and indirectly to the second input of the said same gate through a monostable trigger circuit 52 the duration of whose quasi-stable state is $T_2$.

The outputs of the AND-gate 53 and of the comparator 51 are coupled to the blocking input 55 of the regulation device 18 through an OR-gate, 54, followed by a bistable trigger circuit 57 which also has a reset input.

The power unit operates in the manner indicated hereinabove as long as the clamping and blocking inputs of the regulation device do not receive signals.

On production of a light-up order for the projector 10 for example, a change in level, identical to that which takes place at this instant at the input 90 of the switching circuit 9 of FIG. 1, occurs at the input of the converter circuit 41, triggering the production of an output pulse from this circuit. It should be noted that the converter circuits 41, 42 do not react to the transitions from the 1 level to the 0 level on the part of the signals at their inputs, and therefore supply no pulse when a projector is extinguished.

The pulse corresponding to the light-up order for the projector 10, is transmitted by the OR-gate 43 to the monostable trigger circuit 44 whose output signal, applied to the clamping input 45 of the regulation device, fixes the output voltage of the latter at the fixed value $V_a - K\ V_f = V_a - V'_s$, so that during the time $T_1$ the regulation device is not under the control of the signal $V_e$ which, during the light-up phase, is made up only of parasitic signals. The time $T_1$ is, of course, chosen so that it lasts at least until the return to the normal condition, of the circuits of the submarine equipment. In the example described, $T_1$ is 1.5 seconds. At the end of the time $T_1$, the trigger circuit 44 returns to the stable state and, because of the inherent time constant of the amplifier of the regulation device 18, the output voltage $V_a - V'_s$ of the regulation device changes progressively to the value $V_a - V_s$, avoiding any additional disturbance of the submarine equipment.

The feedback loop, between the output 56 and the input 55 of the amplifier 18, is designed to provide protection against surges in the output current from the amplifier 18 and operates as follows: a voltage measured across the terminals of a suitably connected low resistance, and delivered at the output 56 of the regulation device 18 indicates the value of the current I at the regulation device output. If I is between $I_m$ and $I_M$, this occurring for example at the start of light-up of a projector, the comparator 50, the output of which was previously in the 0 state, changes to the 1 state but, since the monostable trigger circuit 52 then changes to the quasi-stable state, the AND-gate 53 remains blocked for the time $T_2$ so that as long as I remains greater than $I_m$ for a time less than $T_2$, no output signal is produced by the AND-gate 53; by contrast, if I remains greater than $I_m$ for a time longer than $T_2$, the output signal from the AND-gate 53, which had the 0 state, changes to the 1 state, causes the bistable trigger circuit 57 to change state and the latter, by applying its output voltage to the blocking input 55 of the regulation device 18 causes the latter to deliver a zero voltage. The value of $T_2$ is adjusted to ensure that surge currents which are produced on light-up of a projector, run no risk of blocking the power unit; in the example described $T_2 = 150$ ms. If I is greater than $I_M$, a blocking of the power unit occurs immediately. The two comparators 50 and 51 thus respectively provide protection against persistent accidental overload, and against dead shorts.

The system may advantageously comprise auxiliary circuits for improving its operation when it is first put into service, i.e. for ensuring that no light-up of a projector will then occur and that, when the voltage conditions are again normal, the bistable trigger 57 is in the 0 state.

The auxiliary circuits may for example include in each of the input connections 90 and 91 of the switching circuit 9 (FIG. 2) an AND-gate, the second input of which is energized by a time-delay transistor-switch, controlled by a voltage delivered by the voltage converter 15, the time delay being due to an R.C. circuit coupled to the control electrode of the transistor.

As concerns the trigger circuit 57, it may include between an auxiliary output of the voltage source 17 and the reset input of this trigger circuit 57 a similar time-delay transistor-switch followed by a monostable trigger circuit delivering a zeroing pulse.

Although connections between the power unit 2 and the elements 3, 4 and 5, have not been shown, self-evidently these later elements are preferably supplied by this power unit.

It will readily be seen that the described embodiment of the invention was only given by way of a non-limitative example.

What is claimed is:

1. A system for transmitting electrical power to a plurality of devices, including n first devices where n is a positive integer, said n first devices having respective inputs, said system comprising: a power unit, having an output, for delivering power in the form of a d.c. current; a control unit for generating $2n$ control signals, said control unit having an output for delivering said control signals; a cable having first and second ends, said first end being coupled to said output of said power unit and to said output of said control unit; a switching device having a power input coupled to said second end for receiving said electrical power; n power outputs respectively coupled to said n first devices, and $2n$ control inputs; $2n$ gating circuits having respective inputs coupled to said second end for respectively receiving said $2n$ control signals and having respective outputs respectively coupled to said $2n$ control inputs; $2n$ memory circuits for, respectively, temporarily storing the output signals from said $2n$ gating circuits, said memory circuits having respective inputs respectively connected to said outputs of said $2n$ gating circuits, each of said $2n$ memory circuits having an output connected to the $2n$-1 gating devices to which its input is not connected.

2. A system as claimed in claim 1, wherein said power unit comprises a power source having an output and a regulation device having a power input coupled to said power source output, an output coupled to said first end of said cable and first and second control inputs, and wherein said system further comprises means, coupled to said second end of said cable, for delivering a voltage error signal, and transmitting said voltage error signal through said cable, means inserted between said first end of said cable and said first control input for delivering to said first control input a voltage regulating signal, means having an input coupled to said output of said control unit and an input coupled to said second control input for applying to said second control input a signal fixing to a predetermined value for a predetermined duration the output voltage from said regulation device upon the occurrence of at least predetermined ones of said control signals.

* * * * *